C. A. FISHER.
CHERRY STONER.

No. 103,317.

Patented May 24, 1870.

Witnesses:
Chas. Niola
Edgar Tate

Inventor:
C. A. Fisher
Per Mmm H
Attorneys.

THE NORRIS PETERS CO., PHOTO-LITHO., WASHINGTON, D. C.

United States Patent Office.

CHARLES A. FISHER, OF PHILADELPHIA, PENNSYLVANIA.

Letters Patent No. 103,317, dated May 24, 1870.

IMPROVED CHERRY-STONER

The Schedule referred to in these Letters Patent and making part of the same

*To all whom it may concern:*

Be it known that I, CHARLES A. FISHER, of the city of Philadelphia, county of Philadelphia and State of Pennsylvania, have invented a new and improved Cherry-Stoner; and I do hereby declare that the following is a full, clear, and exact description thereof, which will enable others skilled in the art to make and use the same, reference being had to the accompanying drawings forming part of this specification.

This invention relates to improvement in apparatus for stoning cherries, and consists in the combination with a pair of plates hinged together, and provided with recesses in the two faces which come together, which faces form molds for holding the cherries, of a follower, provided with a plunger for each mold, and a case for the whole, the said mold-plates being provided with small passages through the molds for the passage of the plungers, by which the stones are thrust out, all as hereinafter more fully specified.

Figure 1:
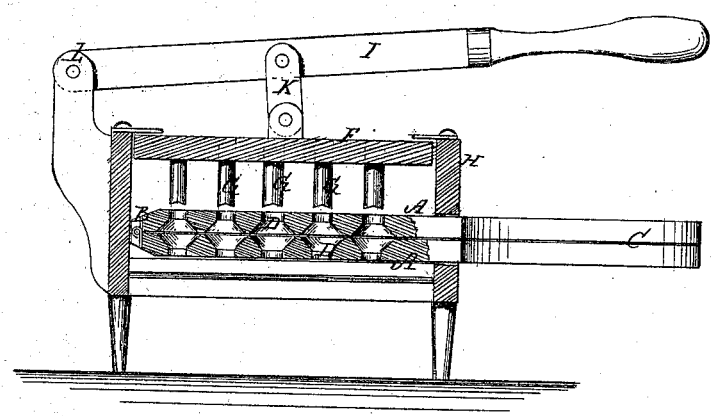
Figure 2:
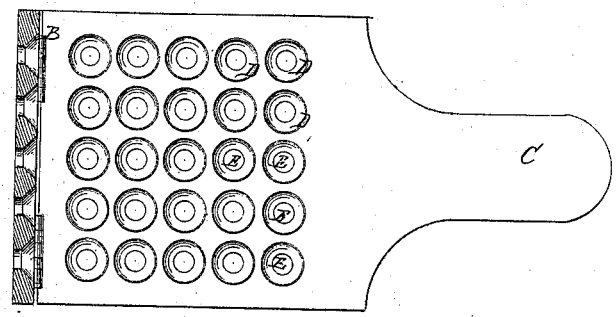

Figure 1 represents a transverse sectional elevation of my improved apparatus, and Figure 2 represents a plan view of one of the mold-plates, and a section of the other, which stands perpendicular to the first.

A is a pair of broad flat plates, of any preferred size and material, hinged together at B, and, for convenience, provided, at the sides opposite the hinges, with handles C. They are arranged to close upon each other, as shown in fig. 1, and the faces coming into contact are provided with recesses or molds D, arranged in rows or in any preferred order, and each mold of one plate coinciding with a corresponding mold of the other, and coinciding with the centers of these molds are small holes E, passing through the mold-plates.

F represents a follower, provided with pins or plungers G, one for each passage E, and all arranged on the same order as the molds and the holes, and fitted to work in the said holes.

H is a case, with a slot in the side for the admission of the mold-plates when closed, and serving as a guide for the follower, which is placed in the top above the mold-plates, and it is provided with a lever, I, for working it up and down, to which it is connected by a link, K.

L is a fulcrum for the said lever.

These mold-plates may have any preferred number of molds, and corresponding numbers of plungers may be used.

To use this improved apparatus, the mold-plates are taken out of the case, opened, and placed as represented in fig. 2, and a quantity of cherries are scattered over the plate, lying with its face up, so as to cause a cherry to fall into each mold. The mold-plates are then closed and placed in the case, under the plungers, which are pressed down through the cherries, forcing the stones out below. The plunger is then withdrawn, the molds taken out, opened, and the cherries discharged by holding the molds downward, and gently striking the plates on any solid substance.

The mold-plate which stands in the lowest position in the case may have a sheet of rubber or other substance placed on its lower side, with cross-slits under the holes for the plungers to pass through, for closing around them to scrape off any part of the cherries which may adhere to them, or any other cleaning or discharging devices may be employed.

The operating-lever may be dispensed with, if preferred, and the follower operated by hand.

I do not desire to claim, broadly, a cherry-stoner which holds the fruit in a mold while a plunger forces out the stone, since I am fully aware that machines operating on this principle are in common use; but What I do esteem to be my invention, and desire to protect by Letters Patent, are the following improvements on such machines, namely:

The combination of the independent plungers G with a detachable clamp, constructed and operated in the manner set forth.

The above specification of my invention signed by me this 20th day of August, 1869.

CHAS. A. FISHER.

Witnesses:
 GEO. W. MABEE,
 ALEX. F. ROBERTS.